(12) United States Patent
Muratov et al.

(10) Patent No.: US 7,159,120 B2
(45) Date of Patent: Jan. 2, 2007

(54) METHOD AND SYSTEM FOR PROTECTING DATA WITHIN PORTABLE ELECTRONIC DEVICES

(75) Inventors: Alexander Victorovitch Muratov, Rostovskaya obl. (RU); Ronald Eugene Foley, Oak Park, MI (US)

(73) Assignee: Good Technology, Inc., Santa Clara, CA (US)

( * ) Notice: Subject to any disclaimer, the term of this patent is extended or adjusted under 35 U.S.C. 154(b) by 878 days.

(21) Appl. No.: 09/988,402

(22) Filed: Nov. 19, 2001

(65) Prior Publication Data

US 2003/0097596 A1    May 22, 2003

(51) Int. Cl.
*G06F 12/14* (2006.01)
*G06F 1/00* (2006.01)

(52) U.S. Cl. .............. 713/182; 713/183; 713/193; 713/194; 726/26; 380/277; 380/281; 715/700

(58) Field of Classification Search ............... 713/182, 713/183, 193, 194; 726/26; 380/277, 281; 715/700
See application file for complete search history.

(56) References Cited

U.S. PATENT DOCUMENTS

| | | | | |
|---|---|---|---|---|
| 4,634,807 A | * | 1/1987 | Chorley et al. | 705/55 |
| 5,355,414 A | * | 10/1994 | Hale et al. | 726/34 |
| 5,574,786 A | * | 11/1996 | Dayan et al. | 726/36 |
| 5,862,472 A | * | 1/1999 | Park | 455/411 |
| 6,249,868 B1 | * | 6/2001 | Sherman et al. | 713/168 |
| 6,370,250 B1 | * | 4/2002 | Stein | 380/281 |
| 6,370,402 B1 | * | 4/2002 | Hakomori | 455/550.1 |
| 6,501,380 B1 | * | 12/2002 | Jakobsson | 340/571 |
| 6,504,480 B1 | * | 1/2003 | Magnuson et al. | 340/571 |
| 7,047,426 B1 | * | 5/2006 | Andrews et al. | 713/155 |

FOREIGN PATENT DOCUMENTS

| JP | 08-251660 | * | 9/1996 |
|---|---|---|---|
| JP | 2001-016655 | * | 1/2001 |

* cited by examiner

*Primary Examiner*—Taghi T. Arani
(74) *Attorney, Agent, or Firm*—Blakely, Sokoloff, Taylor & Zafman, LLP

(57) ABSTRACT

A system and method for protecting data within a portable electronic device to prevent unauthorized access to that data. Encryption of data within the portable electronic device and automatic erasure of data upon unauthorized attempted access is provided. A limited number of attempts to access the portable electronic device are allowed, and if exceeded, the data is automatically erased without notification. Data transfer functions of the portable electronic device are also disabled when the device is locked. Erasing of data is also provided if the portable electronic device is not synced with another device during a predetermined time period.

32 Claims, 4 Drawing Sheets

METHOD AND SYSTEM FOR PROTECTING DATA WITHIN PORTABLE ELECTRONIC DEVICES

FIELD OF THE INVENTION

The present invention relates generally to portable electronic devices, and more particularly to systems for protecting data within portable electronic devices.

BACKGROUND OF THE INVENTION

The use of portable electronic devices, and in particular Personal Digital Assistants (PDAs), has increased dramatically over the past few years. These devices are used not only for business purposes, but also for personal use. Further, businesses today are more frequently using PDAs to store confidential and sensitive information (e.g., client information).

PDAs are very portable, thereby providing convenience and flexibility, a well as the ability to have access to information (e.g., business information) while in-transit. However, the qualities that make PDAs very attractive, a so make them especially vulnerable to loss and theft. PDAs are easy target for thieves and are often misplaced or lost. Further, publicly available free programs or "hacks" allow for the bypass of the default security systems on PDAs (e.g., the Palm OS® security system). Thus, because of the increased use of PDAs, and in particular, for storing confidential and sensitive information, PDA security and protection of information stored therein is a serious concern. The actual cost of hardware replacement is negligible compared to the potential liability for compromised sensitive data.

Unauthorized access to confidential information such as, for example, passwords, credit card numbers, customer lists and client information can have serious consequences. It is critical that PDAs are secured from security breaches. However, standard security on PDAs (e.g., the Palm OS® security system with password protection) is often very limited and generally does not provide the protection needed for sensitive data stored within these devices. Thus, there exists a need to provide an improved security system for protecting portable electronic devices, such as PDAs, and in particular, for protecting the sensitive data within these devices. It is desirable for such a system to not only protect the data within the device by limiting access thereto, but to provide mechanisms to ensure that the sensitive data is not compromised in the event that unauthorized access is attempted.

SUMMARY OF THE INVENTION

The present invention provides a method and system for protecting data within portable electronic devices, such as, for example, PDAs, including the Palm, Pocket PC and Blackberry devices, among others. Various levels of protection are provided based upon the particular requirements for a device.

In general, the present invention provides a security system for portable electronic devices and wraps the device in a user-transparent interface. Essentially, a multi-tiered security system is provided to protect data within portable electronic devices to prevent both the accidental and intentional compromise of sensitive data stored within the devices. The multi-tiered security system includes encrypting data to be protected, automatic data erasing (e.g., bit-wiping) upon attempted security breaches and disabling any data transfer mechanisms such as, for example, HOTSYNC® transfers and the IrDA port when the device is locked by the present invention.

The security system may allow for unlimited password attempts or a limited predetermined number of attempts (i.e., default or user defined), after which the data within the device is erased or deleted. Erasing or deleting of the data preferably is provided by bit-wiping the data (e.g., overwriting the data with a series of characters). Multiple-pass overwriting of data also may be provided. The security system also may erase the data after a predetermined time period between syncing the PDA to another device (e.g., designated desktop computer).

Specifically, a method of the present invention for protecting data within a portable electronic device (e.g., PDA) includes erasing the data after a predetermined number of non-valid passwords are entered that fail to match a valid password. The method further may include requiring entry of a password to access the data within the portable electronic device, determining whether the entered password is the valid password, and allowing access to the data if the valid password is entered. The valid password may be protected.

Further, additional protection of selected data within the portable electronic device may be provided, including encrypting selected data. The security system also provides for decryption on-demand, and in particular, decrypting only a portion of the encrypted selected data being accessed after entry of a valid password.

The method also may provide for bit-wiping the data, including overwriting the data with characters one or more times. The data also may be bit-wiped if a predetermined time period (e.g., default or user defined) from the last syncing of the portable electronic device with another electronic device has expired.

The method further may include locking the portable electronic device and requiring entry of the valid password after a predetermined period of non-operation of a powered on portable electronic device. Further, the step of locking may be performed only after an additional user defined time period after the period of non-operation. Entry of the valid password after manual powering off the portable electronic is required to access a locked portable electronic device.

Additionally, the method may include disabling data transfer means to prevent transfer of the protected data until the valid password is entered. The method also may require entry of a password to restrict access to selected applications within the portable electronic device. Displaying a lockout screen having the appearance of a normal start-up screen of the portable electronic device and having a password entry portion also may be included.

The present invention also provides a method of protecting data within a portable electronic device to prevent access the protected data when in a locked mode. This method includes encrypting the data when in the locked mode and erasing the data after a predetermined number of non-valid passwords are entered that fail to match a valid password. Data transfer means also may be disabled when in the locked mode.

Entry of the valid password is required upon powering on the portable electronic device after a previous powering off. In addition, after an automatic powering off of the portable electronic device resulting from non-use, the portable electronic device may be locked only after a predetermined time period has expired (i.e., "grace period"). When a valid password is entered the method provides for decrypting only a portion of the encrypted data accessed.

The present invention provides a portable electronic device comprising a data storage component for storing data and a processor programmed to erase stored data after a predetermined number of non-valid passwords re entered that fail to match a valid password. The processor also may be programmed to encrypt the selected stored data and to decrypt only a portion of the selected data being access after entry of the valid password.

A display provided as part of the portable electronic device may be configured with a password entry portion (i.e., processor programmed to provide the password entry portion) for entering a password. Further, the processor may be programmed to recognize depression of buttons provided as part of the portable electronic device for entering a password. The processor may disable data transfer means of the portable electronic device until the valid password is entered.

Thus, the present invention provides a security system and method for protecting data within a portable electronic device that protects data from unauthorized access, disables operation of the device when in a locked mode (e.g., disable data transfer means) and erases the data upon an unauthorized attempt to access the data. The present invention is flexible and provides selectable and customizable features and options.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. Thus, although the present invention is described in connection with security functions configured in a specific manner on a particular device, it is not so limited, and the functions may be configured differently depending upon the specific security needs and the particular device to be protected.

Generally, the present invention provides data encryption (e.g., 64-bit, 128-bit or 512-bit Blowfish encryption) that protects data stored on a portable electronic device. Decryption-on-demand is provided and maximizes performance and response time by decrypting data (e.g., databases) only when they are needed (i.e., accessed for the first time after entering a valid password). Limiting the number of attempts to unlock the device prevents unauthorized access to encrypted data. When the maximum number of attempts is exceeded, the data is erased (e.g., bit-wiping all protected random access memory (RAM) databases and data on external storage media, such as, a Secure Digital (SD) card) without a user prompt. It should be noted that a user can restore the data from his or her personal computer or other device to which the portable electronic device has been synced, if the device is recovered or replaced with a new unit.

Further, unauthorized access to data is prevented (e.g., if a PDA is lost or stolen) by automatically bit-wiping the data if the device is not synced within a specified time period. If an application uses multiple databases, specific databases may be selected for encryption. An optional hardware button password entry also may be provided. The present invention is preferably activated even after a soft reset of a locked device, requiring a user to provide a password to gain access.

The present invention also disables data transfer mechanisms, such as, for example, HOTSYNC® and IrDA, when the device is locked. Further, use of system shortcuts, for example, to access maintenance applications such as the Palm OS® debugger, is prevented.

With respect to the stored valid password, only a protected form of the password is preferably stored using an MD5 hash. Further, the encryption key is erased after the device is locked. The encryption key is generated when a user enters the correct password. The password also is masked (i.e., with asterisks (*)) as it is entered on the portable electronic device screen. An optional stealth mode may be provided to change the system lockout screen to appear like the standard security dialog screen on the portable electronic device. Password entry also may be required before user designated applications can be executed.

The present invention also may provide for distinguishing between a user shut-off and an automatic shut-off (ire., time-out), and a "grace period" may be provided before the device is locked.

Figure 1:
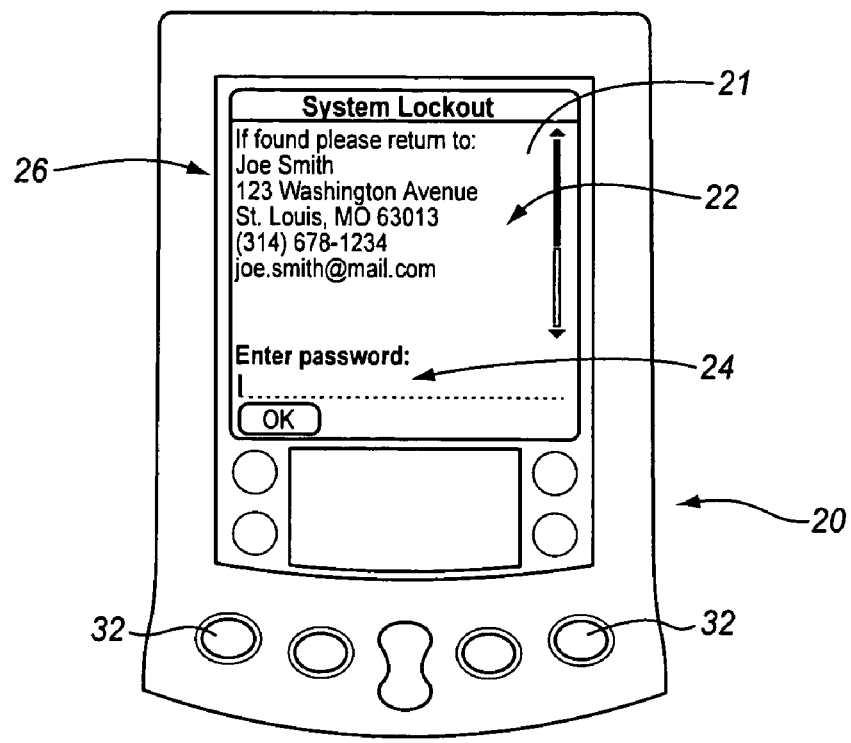
FIG. 1 is a PDA screen shot of a System Lockout screen of the present invention.

Specifically, and with respect to protecting a portable electronic device according to the principles of the present invention, the following security functions are generally provided: (1) password protection; (2) encryption of data; (3) erasing of data upon attempted unauthorized access; and (4) locking of the device after shut-off. In particular, when a locked device, for example a PDA, such as a Palm type PDA, indicated generally in FIG. 1 by reference numeral 20, is powered up, a System Lockout (i.e., security) screen 22 is displayed on the PDA 20 screen 21 that requires a user to enter their password in a password entry portion 24 in order to unlock and access information on the PDA 20 as described in more detail herein. It should be noted that all access to the data through the PDA 20 is locked until the correct password is entered. Further, it should be noted that the System Lockout screen 22 may include contact information 26 for the owner of the PDA 20, including, for example, name, address, telephone number and email address.

Figure 3:
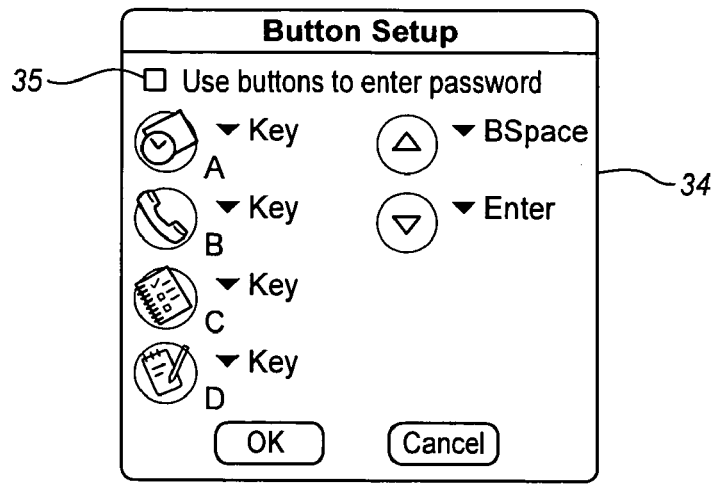
FIG. 3 is a PDA screen shot of a Buttons setup screen of the present invention.

The system lockout function of the present invention preferably provides the following: (1) prevents access to the PDA 20 unless a valid password, preferably case-sensitive, is entered on the System Lockout screen 22 or using hardware buttons 32 set-up using a Button setup screen 34 as shown in FIG. 3 and as described in more detail herein; (2) prevents access to the PDA 20 by disabling data transfer means (e.g., infrared port); (3) prevents data transfer, for example, using HOTSYNC® until the correct password is entered; (4) prevents access to maintenance programs of the PDA (e.g., the Palm OS® debugger) using shortcuts; (5) hides the password visibly by replacing each character entered into the password entry portion 24 with a symbol (e.g., an asterisk ("*")) as it is entered; (6) provides owner contact information 26, or provides access to an owner information screen of the PDA 20; and (7) provides the system lockout even if a reset is attempted (e.g., reset button on back of PDA 20 depressed).

Preferably, in operation, the password functionality of the present invention removes and replaces the existing password protection installed on the PDA 20. Thereafter, password protection according to the present invention is provided.

With respect to the Buttons setup screen 34 as shown in FIG. 3, when enabled, the buttons 32 on the PDA 20 may be used to enter a password. To enable this function, the checkbox 35 on the top of the Buttons setup screen 34 is selected. This function allows for the assignment of a character key, the backspace key or enter key to each of the hardware buttons 32.

Figure 2:
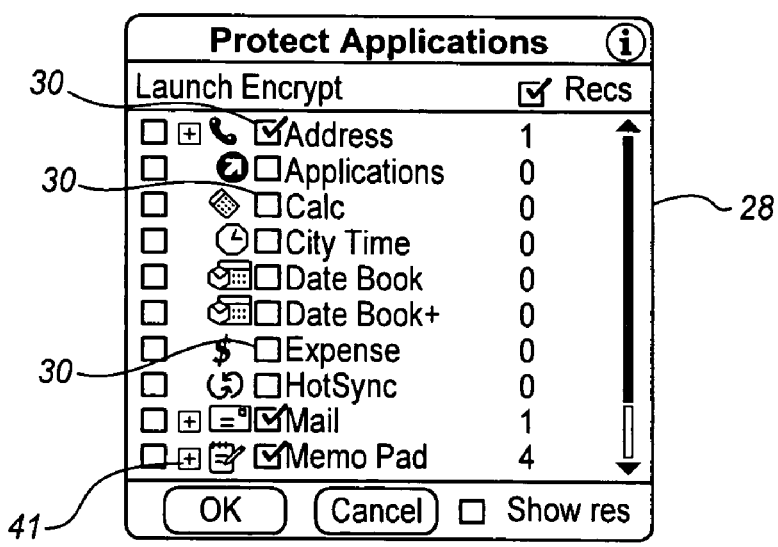
FIG. 2 is a PDA screen shot of a Protect applications screen of the present invention.

With respect to encrypting data according to the present invention, a user can choose to encrypt none, some, or all of the databases on the PDA 20, which preferably includes any database, for example, in PDB format on a PDA operating on a Palm Operating System (OS), Preferably, a Protect applications screen 28 as shown in FIG. 2 is provided to select specific applications and data for protection as described in more detail herein. As shown therein, a checkbox 30 is selected to identify the particular applications, and specifically the associated data, that is to be protected. It should be noted that the present invention preferably encrypts the selected databases automatically when the PDA 20 is turned off.

More particularly, and as described herein, a "Filter . . . " virtual button 39 on an Encryption setup screen 36 selects the Protect Applications screen 28, which allows for the selection of databases to include/exclude for encryption protection, and to choose whether to password-protect the launch of applications. In one embodiment, encryption of selected predetermined databases is provided (e.g., the four built-in Palm OS® databases—Address, Datebook, ToDo and Memo). In another embodiment, selection of any application or encryption is provided, as well as choosing whether to provide launch protection. Further, in this embodiment, database files within an application may be selected for encryption (i.e., by selecting (i.e., tapping with a stylus) the "+" symbol 41 next to a database name). Indications as to the protection provided to a particular database also may be displayed, for example, if a checkbox 30 is checked and shaded, this indicates that only some of the databases for that particular application are marked as protected with encryption.

Preferably, default settings for encryption are provided. For example, on a PDA 20 operating on Palm OS®, all record databases (e.g., .pdb files) are encrypted by default, and all resource databases (e.g., .prc files) are not encrypted. Further, and for example, any new database or application loaded into the PDA 20 is encrypted by default until deselected (i.e., removing the check in the checkbox 30). Restrictions also may be provided. For example, shared libraries may be prohibited from encryption.

Thus, in operation, the present invention provides for encrypting any portion of the data within the PDA 20 that is selected. It should be noted that this may include all data within the PDA 20. Further, only selected records in certain databases may be encrypted. Preferably, the following options for selecting data to be encrypted are provided using the encryption field 58: (1) encrypt all data in selected databases (i.e., all public and private records from the list of databases selected); (2) encrypt all private records on the PDA 20 regardless of the database with which the records are associated; (3) encrypt all private record from specific databases designated by, for example, a user; and/or (4) encrypt lone of the data on the PDA 20.

Figure 4:
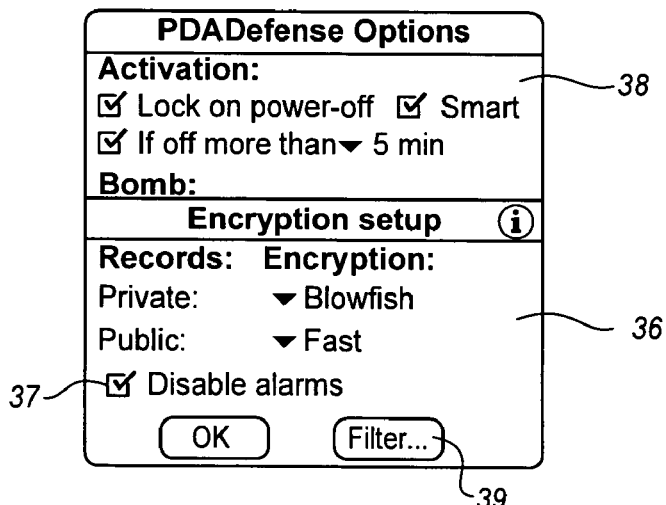
FIG. 4 is a PDA screen shot of an Options and Encryption setup screen of the present invention.

General encryption options are preferably selected using an Encryption setup screen 36 as shown in FIG. 4. Specifically, the Encryption setup screen 36 provides for choosing the desired encryption algorithm (e.g., "fast" or "Blowfish") for encrypting private and/or public records. The fast algorithm is preferably less complex algorithm designed for speed, but is not as secure as Blowfish (e.g., used to encrypt large amounts of public data versus private records). The "Disable alarms" checkbox 37 allows for disabling all pending alarms. For example, in order to encrypt specific databases, such as the Datebook id a PDA 20 operating the Palm OS®, the PDA 20 alarms should be disabled. The "Filter . . . " virtual button 39 selects the Protect Applications screen 28 as shown in FIG. 2 and described in more detail herein.

It should be noted that the data may be encrypted in any known and suitable manner, including, for example, using a Blowfish encryption (e.g., 64-bit key, 128-bit key or 512-bit key). A less complex algorithm also may be provided for faster encryption with a lower level of protection, such as, implementing a 128-bit encryption key with lower security means. Further, different types of encryption may be selected for different types of data (e.g., public records and private records). All data selected for encryption is automatically encrypted when the PDA 20 is locked (e.g., when powered off).

Further, the valid password (i.e., pre-defined password) used to unlock the PDA 20 is preferably protected using, for example, an MD5 hash. Also, the key that is used to encrypt the valid password is not stored on the PDA 20. Preferably, the application code regenerates the key each time it is needed.

With respect to decrypting the protected data, when the correct password is entered in the password entry portion 24, the data (i.e., databases) automatically may be decrypted. More preferably, decryption is provided only to the specific databases that are being accessed (e.g., Palm OS® databases).

Figure 7:
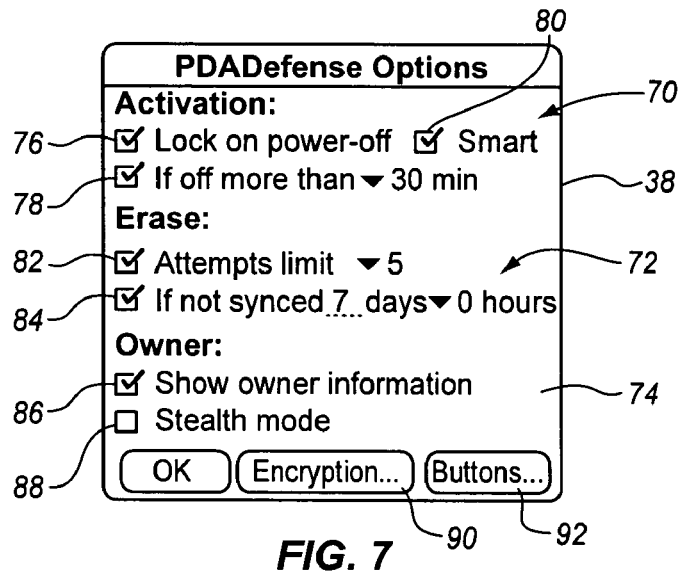
FIG. 7 is another PDA screen shot of the Options screen as shown in FIG. 4.

With respect to erasing data in a PDA 20 upon attempted unauthorized access, all data, which is preferably all applications and data residing in the RAM of the PDA 20, as well as any external storage devices, is deleted from the PDA 20, and the PDA 20 returned to "factory condition" if certain events occur. In particular, data within the PDA is erased if non-valid passwords are entered a predetermined number of times (e.g., 3–10 or never), which may be a default setting, user setting or set by an administrator. The data also may be erased if the PDA 20 is not synced with another device (e.g., HOTSYNC® with a PC) within a predetermined period of time (e.g., 8 hours to 99 days, or never), which may be a default period, a user-configurable amount of time or configured by an administrator. Options relating to erasing data and locking the PDA 20 are preferably provided on an Options screen 38 as shown in FIGS. 4 and 7.

Specifically, the Options screen 38 provides an activation portion 70 for selecting activation options, an erase portion 72 for selecting data erase options and an owner portion 74. The activation portion 70 preferably provides th following:

(1) "Lock on power-off" checkbox 76 to enable/disable an AutoLock feature. If the AutoLock function is enabled, the PDA 20 will be locked when it is subsequently turned off (i.e., either by the power button or auto power-off).

(2) "If off more than ___" checkbox 78 to enable/disable a Delayed AutoLock feature. If the Delayed AutoLock function is enabled, a selection for delay times ranging from, for example, 1 minute to 3 hours are provided. With the Delayed AutoLock function enabled, the PDA 20 will only be locked when the delay time period has expired after the device is powered off.

(3) "Smart" checkbox 80 to enable/disable a Smart AutoLock function. This provides for immediately locking the PDA 20 after the power button is pressed and will wait the specified time period (i.e., "grace period" defined by the delay time as part of checkbox 78) after automatic power off.

The Erase portion 72 preferably provides the following:

(1) "Attempts Limit" checkbox 82 to enable/disable the erase function when the PDA 20 is powered on. When enabled, the selection of a predetermined maximum number of attempts at valid password entry is provided (e.g., select from a range of three to ten attempts). For example, 5 is selected as shown in FIG. 7. In this case, when a locked PDA 20 is turned on, an individual has five attempts to enter the valid password in the password entry portion 24, and if all five attempts are not valid, data within the PDA 20 is automatically erased as described herein (e.g., automatically delete all data and applications stored in RAM and in external storage devices). If this function is disabled, a user will have unlimited attempts to enter in the correct password. However, it should be noted that access still cannot be gained without the correct password.

(2) "If not synced" checkbox 84 to enable/disable the erase function when a data syncing operation (e.g., HOTSYNC®) is not performed within a certain predetermined time period. When enabled, the erase function will delete data on the PDA 20 if, for example, a HOTSYNC® is not performed within the specified predetermined time period. Preferably, a user sets the predetermined time period (i.e., entering the number of days between 0 and 99 and entering the number of hours from the pull-down list). Preferably a minimum time period must be selected (e.g., eight hours).

It should be noted that preferably all databases and applications within the RAM of the PDA 20, as well as any connected external storage devices, are deleted or erased by the present invention if unauthorized access is attempted (e.g., exceeded password attempt limit or predetermined time period since last syncing operation).

The Owner portion 74 preferably provides the following:

(1) "Show owner information" checkbox 86 to enable/disable the ability to display the owner information on a locked PDA 20. When enabled, the owner information from, for example, the Palm OS® "Owner Preferences" is displayed on the System Lockout screen 22. This allows for lost devices to be returned to their owner (i.e., if the owner has entered the necessary information in their "Owner Preferences" screen).

(2) "Stealth mode" checkbox 88 to enable/disable a function that causes the PDA 20 to mimic the original security screen (i.e., same appearance). Even if the erase function is enabled, the PDA 20 will not display remaining attempts number in this mode.

The "Encryption . . . " virtual button 90 allows access to the Encryption setup screen 36 and the "Buttons . . . " virtual button 92 allows access to the Buttons setup screen 34.

With respect to locking a PDA 20 according to the present invention, a PDA 20 may be placed automatically in a "locked" mode once the PDA 20 is shut off. The valid password then must be entered to gain access to data within the PDA 20. The locking of a PDA 20 may be delayed a predetermined period of time (e.g., "grace period" of 1 minute to 3 hours) after an automatic shutoff (i.e., not necessary to enter a password when the PDA 20 shuts down during active use).

With respect to installing the security system of the present invention on a PDA 20, an installation file is preferably provided, which may be, for example a compressed file. For example, the following files may be provided for use with a PDA 20 operating using the Palm OS®:

PDADefense.prc: security program

PDAGuard.prc: Companion program—required to be installed with PDADefense.prc

PDAPro.exe or PDAStd.exe: Self extracting install file for Windows users

BacklightII.prc: ONLY FOR PALM M50x users—replacement backlight utility

PDADefense README.txt: Quick start instructions and purchase information

PDADefense User Guide.html: User Guide logo.gif: logo graphic

End User License Agreement.txt: End User License agreement for the installation and use of the security program.

With respect to installing the security program that implements the functions of the present invention, and for example in connection with a PDA 20 operating using the Palm OS®, the following steps are preferably performed:

1. HOTSYNC® the PDA 20 device to back up data.
2. Follow the procedures to install Palm OS® files on the PDA 20, install both PDADefense.prc and PDAGuard.prc using HOTSYNC®.
3. After the HOTSYNC® is complete that installs PDADefense.prc and PDAGuard.prc, a reset is performed to complete the installation process.
4. After the reset, set a password and other desired options as described herein.

With respect to uninstalling the security program that implements the functions of the present invention, and for example in connection with a PDA 20 operating using the Palm OS®, the following steps are preferably performed:

1. Choose uninstall from a menu (e.g., PDA 20 main menu).
2. Reset the PDA 20.
3. Delete the program from the PDA 20 using the standard uninstaller (i.e., Palm OS® application launcher).

It should be noted that an initial trial version of the program may be loaded with a licensed version installed after purchasing the full version. Further, other actions may be required during installation. For example, for Palm M50x users, the backlight utility may have to be removed.

Figure 5:
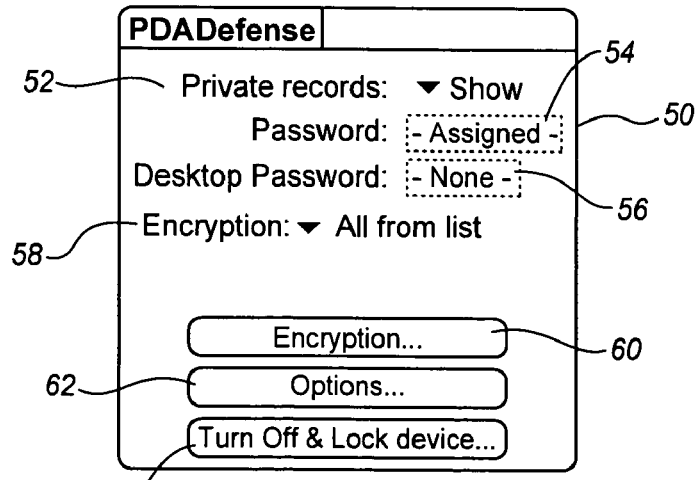
FIG. 5 is a PDA screen shot of a main screen of the present invention.

After installation a security program having the functions of the present invention, a main screen 50 as shown in FIG. 5 is preferably accessible on the PDA 20. The main screen 50 preferably provides the following functionality.

(1) Private records field 52—Show/Hide (Mask) options are available to allow for showing, hiding or masking private records in the databases of the PDA 20.

(2) Password field 54—shows password status (i.e., assigned or unassigned), and provides for assigning (i.e., entering) a new password, changing the current password, or deleting the existing password.

(3) Desktop password field 56—allows for setting a separate password for the Palm desktop.

(4) Encryption field 58—allows for selecting one of four encryption modes during PDA 20 locking:
No (i.e., no encryption at all)
All Private Records
A Private Records from selected databases
All from list (i.e., all records from selected databases)

(5) Register virtual button (not shown) on trial versions only allows access to a Software License screen to enter license key on this screen to activate a registered version.

(6) Encryption virtual button 60—accesses the Encryption setup screen 36.

(7) Options virtual button 62—accesses an Options screen 38.

(8) "Turn Off and Lock device . . . " virtual button 64—turns off and locks the device.

Figure 6:
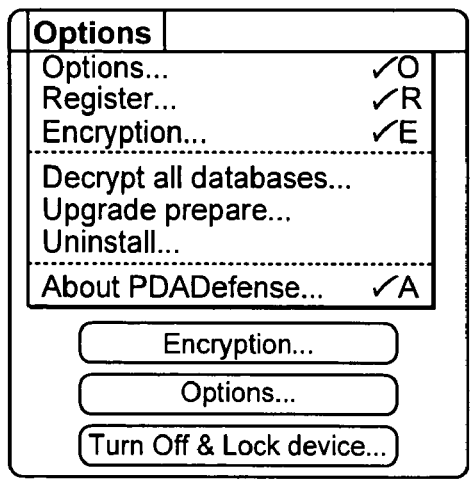
FIG. 6 is a PDA screen shot of an Options pull down menu of an exemplary PDA.

Using the standard menu of a PDA 20, and for example in connection with a PDA 20 operating using the Palm OS®, the pull down menu preferably provides the following functionality as shown in FIG. 6:

(1) Options . . . " (/O) opens the options form.

(2) "Register . . . " (/R) to register and purchase.

(3) "Encryption . . . " (/E) opens the encryption setup form.

(4) "Decrypt all databases . . . ," decrypts all encrypted databases.

(5) "Upgrade prepare . . . " prepares the application for upgrade to a newer version of the program.

(6) "Uninstall . . . " (/U) prepares the application for removal from the PDA 20.

(7) "About PDA Defense . . . " (/A) opens an "About PDA Defense" screen.

(8) "Administrator . . . " (/D) (not shown) accesses an Administrator screen 100.

Figure 8:
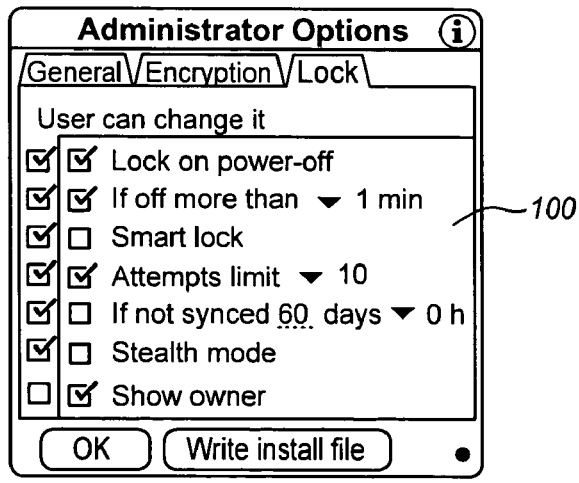
FIG. 8 is a PDA screen shot of an Administrative Options screen of the present invention.

It should be noted that with respect to the security functions provided by the present invention, custom security attributes (e.g., strong passwords, always-on AutoLock, different encryption algorithms, etc.) may be specified to meet particular requirements (e.g., company requirements). Further, a logo (e.g., corporate logo) may be provided on the System Lockout screen 22. Preconfigured protection options also may be provided. With respect to customizing the protection features, a system administrator may lock out certain options (e.g., set password attempts to 10) using an Administrative Options screen 100 as shown in FIG. 8.

Figure 9:
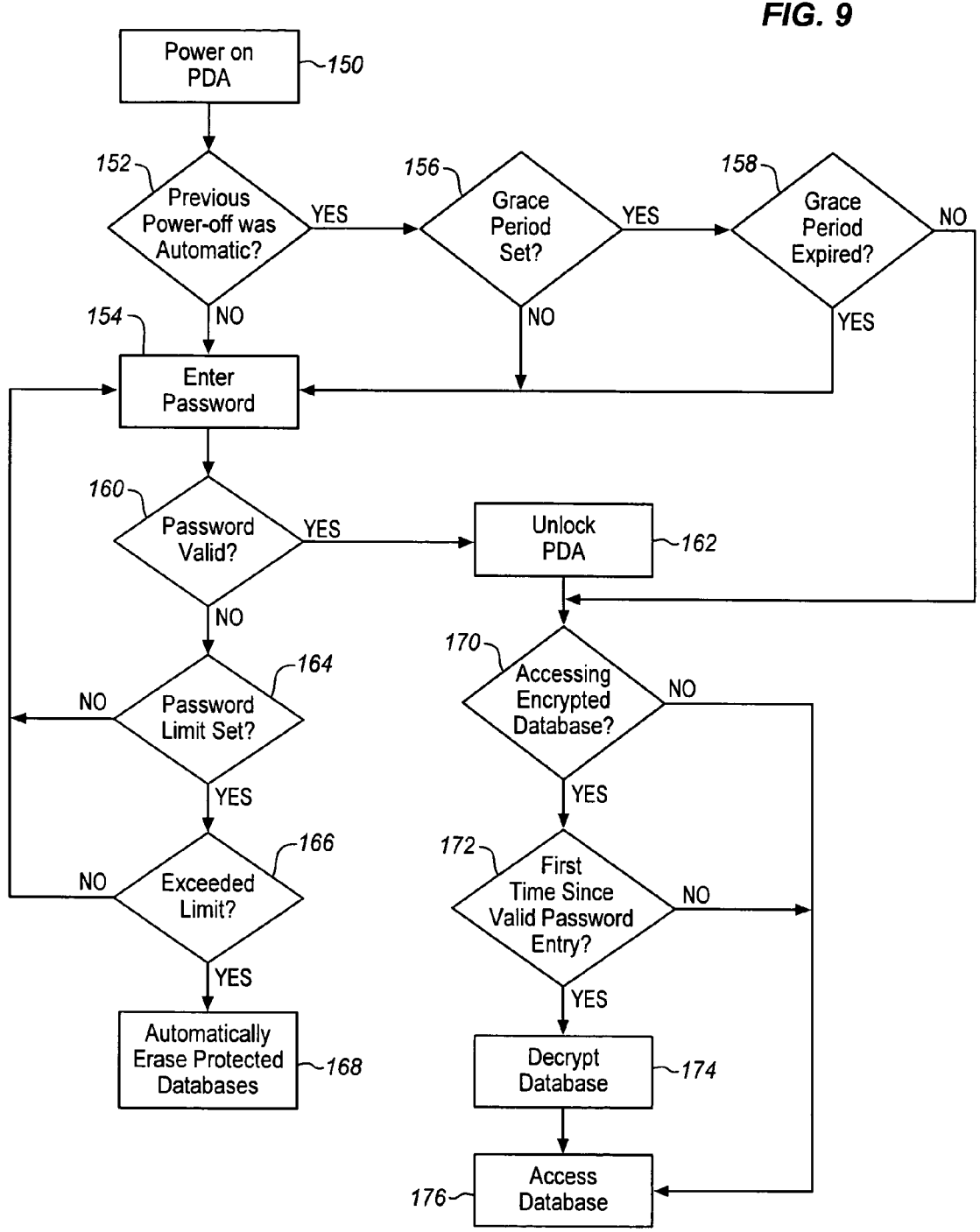
FIG. 9 is a flowchart showing the data protection process of the present invention.

In operation, and as shown in flowchart form in FIG. 9 in connection with protecting data within a PDA 20, with the security system and method of the protecting data according to the principles of the present invention implemented within the PDA 20, the PDA 20 is powered on at step 150. A determination is made as to whether the immediately preceding power-off of the PDA 20 was automatic at step 152. If the power-off was not automatic (i.e., manual), and the "smart" checkbox 80 is enabled, then at step 154 a password is entered using the password entry portion 24 on the System Lockout screen 22 that appears upon power-up. If the immediately preceding power-off was automatic, or if not automatic and the "smart" checkbox 80 is not enabled, then a determination is made as to whether a "grace period" is set at step 156. If no "grace period" is set, then a password is entered at step 154. If a "grace period" is set, then at step 158 a determination is made as to whether the "grace period" has expired (i.e., time period set by user to allow access to the PDA 20 without entering a password after an auto power shut-off). If the "grace period" has expired, then a password is entered at step 154. If the "grace period" has not expired, access to the unlocked PDA 20 (i.e., previous valid password entered) is allowed.

Upon entry of a password at step 154 (i.e., using a stylus and the screen 21 or hardware buttons 32), a determination is made at step 160 as to whether the password is the valid password. If the password is valid, then the PDA 20 is unlocked at step 162 and access to the data therein is allowed. If the password entered is not the valid password, then at step 164 a determination is made as to whether a password entry limit has been set. If no limit is set, then another attempt at entering a password is allowed at step 154. If a password entry limit has been set, then at step 166 a determination is made as to whether the limit has been exceeded (e.g., 4 attempts allowed). If the limit has not been exceeded, then another attempt at entering a password at step 154 is allowed. If the limit has been exceeded, then at step 168 preferably all databases and applications residing in RAM of the PDA 20 and/or external storage devices connected to the PDA 20 are erased without any warning or notification. It should be noted that depending upon the particular portable electronic device 223 other data may be erased.

Once the PDA has been unlocked at step 162 or if the "grace period" has not expired at step 158, a determination is made at step 170 as to whether access to an encrypted database is being attempted. If the database being accessed is not encrypted, then at step 176, access to the database is provided. If the database is encrypted, then a determination is made at step 172 as to whether this is the first access of this particular database since powering on the PDA 20 and entering a valid password. If access of the database is for the first time, then at step 174 the database is decrypted and access thereto is provided a step 176. If the database was previously accessed since the last power-up and entry of a valid password, then the database is accessed at step 176.

Thus, as shown in FIG. 9, the present invention provides for protecting data within a portable electronic device, such as, for example, a PDA 20. In particular, if attempted unauthorized access is detected (i.e., exceeded password entry limit at step 166), then preferably all databases and applications residing in RAM of the PDA 20 and/or external storage devices connected to the PDA 20 are erased without warning or notification. In particular, all RAM databases within the data storage component of the PDA 20 are erased, as well as any data on external storage devices connected to the PDA 20. It should be noted that data within the read-only memory (ROM) of the PDA 20 preferably is not erased.

Further, the present invention provides decryption on-demand, such that encrypted databases are only decrypted when they are accessed after power-up of the PDA 20 and entry of valid password. Also, until the PDA 20 is unlocked at step 162 or a determination is made that a "grace period" has not expired at step 158, all data transfer mechanisms (e.g., infrared port and syncing capabilities) of the PDA 20 are disabled.

It also should be noted that when reference is made to checking or selecting a box or option, this refers to using the buttons 32 on the PDA 20 or a stylus to touch the screen 21 of the PDA 20 to select (e.g., highlight) that option.

Thus, the present invention provides a security system and method from protecting data within a portable electronic device (e.g., PDA). The protection includes encrypting selected databases, automatically erasing data within the portable electronic device upon unauthorized attempted access and limiting access to certain portable electronic device functions (e.g., transfer mechanisms) when it is locked. User selection and customization is provided to allow for flexibility in operation, Although the present invention has been described in connection with providing specific screens as part of a particular portable electronic device, it is not so limited, and different or additional screens may be provided to the portable electronic device for use in implementing the present invention to protect data within the portable electronic device.

The specific data protection functions provided by the present invention may be implemented as required by the particular portable electronic device. Therefore, depending upon the particular PDA 20 and the operating system used on that PDA 20 any appropriate programming language or code (e.g., C, C++ or Visual Basic) may be used to implement the present invention as described herein.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of protecting data within a portable electronic device comprising:
    a user accessing a graphical user interface (GUI) operating on the device to select a predetermined number of attempts that are permitted for a valid password entry;
    determining whether a received password is valid upon detecting an attempt to unlock the device;
    determining whether a number of attempts to enter the password exceeds the selected predetermined number of attempts for a valid password entry; and
    erasing all applications and data stored on the device if the number of attempts exceed the predetermined number of attempts for a valid password entry.

2. The method according to claim 1 further comprising the steps of: requiring entry of a password to access the data within the portable electronic vice; determining whether the entered password is the valid password; and allowing access to the data if the valid password is entered.

3. The method according to claim 2 further comprising protecting the data within the portable electronic device.

4. The method according to claim 3 where in the step of protecting further comprises encrypting selected data.

5. The method according to claim 4 further comprising decrypting only a portion of the encrypted selected data being accessed after entry of a valid password.

6. The method according to claim 1 wherein the step of erasing comprises bit-wiping at least some of the data.

7. The method according to claim 6 wherein bit-wiping the data comprises overwriting the data with characters.

8. The method according to claim 7 wherein overwriting the data is performed a plurality of times.

9. The method according to claim 1 wherein the predetermined number is user defined.

10. The method according to claim 1 further comprising erasing the data after a predetermined time period from the last syncing of the portable electronic device with another electronic device.

11. The method according to claim 10 wherein the predetermined time period is user defined.

12. The method according to claim 2 further comprising locking the portable electronic device and requiring entry of the valid password after a predetermined period of non-operation of a powered on portable electronic device.

13. The method according to claim 12 wherein the step of locking is performed only after an additional user defined time period after the period of non-operation.

14. The method according to claim 2 further comprising locking the portable electronic device and requiring entry of the valid password after powering off the portable electronic device.

15. The method according to claim 2 further comprising disabling data transfer means of the portable electronic device until the valid password is entered.

16. The method according to claim 2 further comprising protecting the valid password.

17. The method according to claim 16 wherein protecting the valid password is provided using an MD5 hash.

18. The method according to claim 2 wherein the step of requiring entry of a password is performed to restrict access to selected applications within the portable electronic device.

19. The method according to claim 2 further comprising displaying a lockout screen having the appearance of a normal start-up screen of the portable electronic device and having a password entry portion.

20. The method according to claim 1 wherein the portable electronic device is a personal digital assistant.

21. A method of protecting data within a portable electronic device to prevent access the data when in a locked mode, comprising:
    a user accessing a graphical user interface (GUI) operating on the device to encrypt selected data whenever the device is operating in a locked mode;
    the user accessing the GUI to select a predetermined number of attempts that are permitted for a valid password entry;
    determining whether a received password is valid upon detecting an attempt to exit the locked mode;
    determining whether a number of attempts to enter the password exceeds the selected predetermined number of attempts for a valid password entry; and
    erasing all applications and data stored on the device if the number of attempts exceed the predetermined number of attempts for a valid password entry.

22. The method according to claim 21 further comprising disabling data transfer means of the portable electronic device in the locked mode.

23. The method according to claim 21 further comprising requiring entry of the valid password upon powering on the portable electronic device after a previous powering off.

24. The method according to claim 21 wherein after an automatic powering off of the portable electronic device based upon non-use, the portable electronic device is not locked until a predetermined time period has expired.

25. The method according to claim 23 further comprising decrypting only a portion of the encrypted selected data accessed after entry of a valid password.

26. A portable electronic device comprising:
    a graphical user interface (GUI) to enable a user select a predetermined number of attempts that are permitted for a valid password entry;
    a data storage component for storing data; and
    a processor programmed to erase all applications and data stored on the data storage component after a predetermined number of non-valid passwords are entered that fail to match a valid password.

27. The portable electronic device according to claim 26 wherein the processor is further programmed to encrypt selected stored data.

28. The portable electronic device according to claim 27 wherein the processor is further programmed to decrypt only a portion of the selected stored data being access after entry of the valid password.

29. The portable electronic device according to claim 26 further comprising a display and wherein the processor is programmed to provide a password entry portion on the display for entering a password.

30. The portable electronic device according to claim 26 further comprising data transfer means and wherein the processor is programmed to disable the data transfer means until the valid password is entered.

31. The portable electronic device according to claim 26 further comprising a plurality of buttons for accessing the stored data and wherein the plurality of buttons are adapted to provide for entry of a password.

32. The portable electronic device according to claim 26 wherein the data storage component comprises a RAM portion and a ROM portion and the processor is programmed to erase all stored data in the RAM after a predetermined number of non-valid passwords are entered that fail to match a valid password.

* * * * *